United States Patent
Kameoka

(10) Patent No.: US 9,442,874 B2
(45) Date of Patent: Sep. 13, 2016

(54) EXPANSION UNIT

(75) Inventor: Hironori Kameoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/411,592

(22) PCT Filed: Jul. 30, 2012

(86) PCT No.: PCT/JP2012/069328
§ 371 (c)(1),
(2), (4) Date: Dec. 29, 2014

(87) PCT Pub. No.: WO2014/020662
PCT Pub. Date: Feb. 6, 2014

(65) Prior Publication Data
US 2015/0169483 A1 Jun. 18, 2015

(51) Int. Cl.
*G06F 13/38* (2006.01)
*G06F 12/02* (2006.01)
*G05B 15/02* (2006.01)
*G05B 19/042* (2006.01)
*G05B 19/05* (2006.01)

(52) U.S. Cl.
CPC ............. *G06F 13/385* (2013.01); *G05B 15/02* (2013.01); *G05B 19/0426* (2013.01); *G05B 19/056* (2013.01); *G06F 12/0246* (2013.01); *G05B 2219/24215* (2013.01); *G06F 2212/7202* (2013.01)

(58) Field of Classification Search
CPC ............. G06F 13/385; G06F 12/0246; G06F 2212/7202; G05B 15/02; G05B 19/0426; G05B 19/056; G05B 2219/24215
See application file for complete search history.

(56) References Cited

U.S. PATENT DOCUMENTS

| 6,993,618 B2 * | 1/2006 | Chen et al. .................. 710/305 |
| 2001/0041592 A1 * | 11/2001 | Suonpera et al. ........... 455/557 |
| 2003/0229472 A1 * | 12/2003 | Kantzes et al. .............. 702/183 |

(Continued)

FOREIGN PATENT DOCUMENTS

| CN | 1550944 A | 12/2004 |
| JP | 11-202911 A | 7/1999 |

(Continued)

OTHER PUBLICATIONS

Notice of the Opinion on Examination issued in the corresponding Taiwanese Application No. 102107788, dated Aug. 27, 2014.

(Continued)

*Primary Examiner* — Eric Oberly
(74) *Attorney, Agent, or Firm* — Sughrue Mion, PLLC

(57) ABSTRACT

An expansion unit includes a connector to which a remote unit is connected, an embedded memory that records therein information in a nonvolatile manner, an external memory I/F into which a memory card is inserted, a CPU that performs reading of the operation information set in the remote unit connected via the connector and performs writing of the operation information into the remote unit connected via the connector, and a memory switching switch that sets a writing destination of the operation information read from the remote unit connected to the connector and a reading source of the operation information to be written into the remote unit connected to the connector to any one of the memory card inserted into the external memory I/F and the embedded memory.

6 Claims, 3 Drawing Sheets

(56) References Cited

U.S. PATENT DOCUMENTS

| | | | | |
|---|---|---|---|---|
| 2010/0293363 A1* | 11/2010 | Meyer et al. | ............... | 713/1 |
| 2011/0208895 A1* | 8/2011 | Wiegers | ............... | H05K 1/18 711/103 |

FOREIGN PATENT DOCUMENTS

| | | | |
|---|---|---|---|
| JP | 2001-175309 A | 6/2001 | |
| JP | 2002-297207 A | 10/2002 | |
| JP | 2009-15401 A | 1/2009 | |
| JP | 2009-205598 A | 9/2009 | |
| JP | 2012-99023 A | 5/2012 | |
| TW | I236614 B | 7/2005 | |
| TW | I273422 B | 2/2007 | |
| TW | M417633 U | 12/2011 | |

OTHER PUBLICATIONS

International Search Report of PCT/JP2012/069328, dated Oct. 23, 2012. [PCT/ISA/210].

Communication dated Nov. 24, 2015, issued by the Korean Intellectual Property Office in corresponding Korean Application No. 10-2014-7035304.

Communication dated Apr. 25, 2016, issued by the State Intellectual Property Office of the P.R.C. in corresponding Chinese Application No. 201280074965.4.

Communication dated May 30, 2016, issued by the Korean Intellectual Property Office in corresponding Korean Application No. 10-2014-7035304.

* cited by examiner

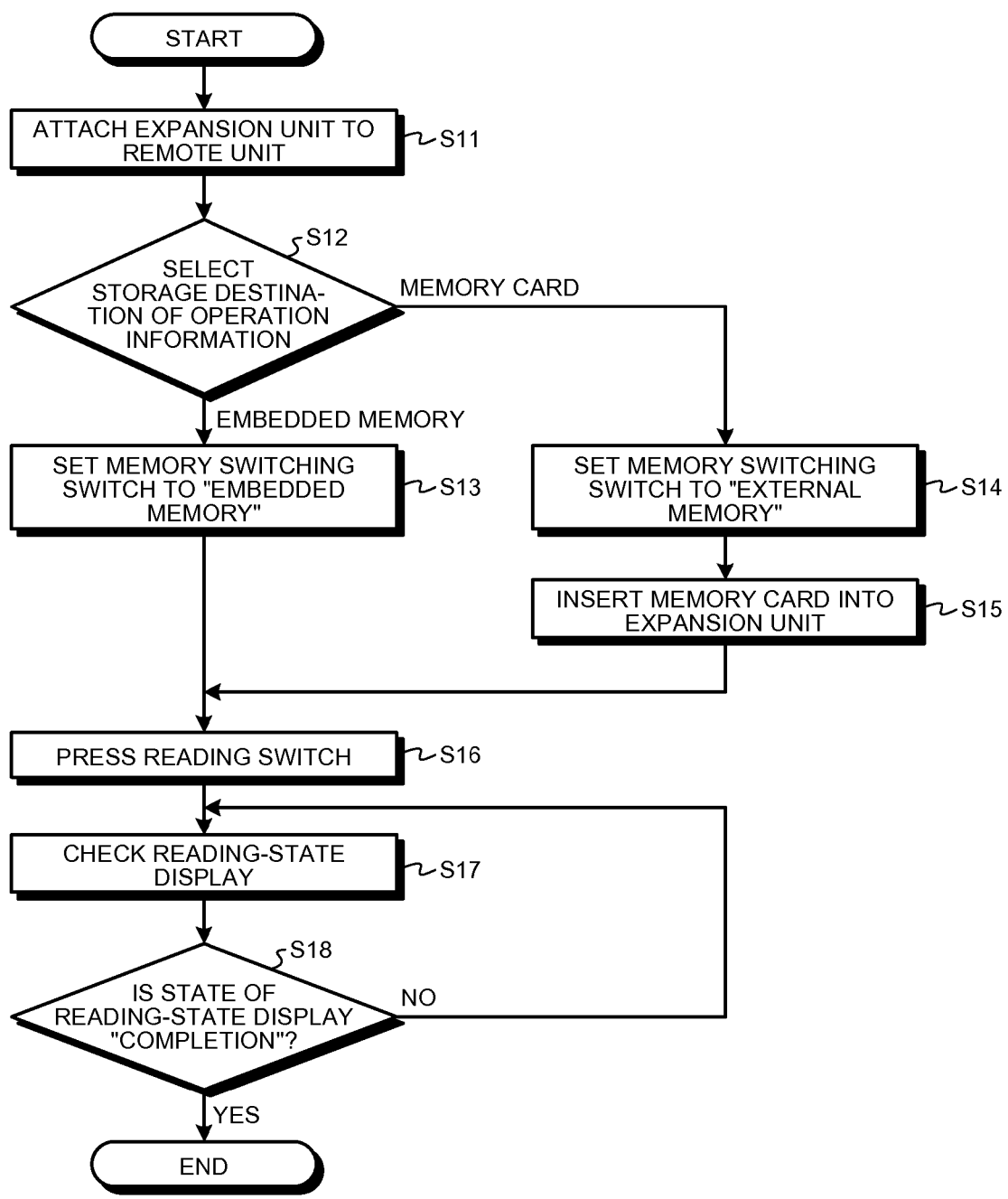

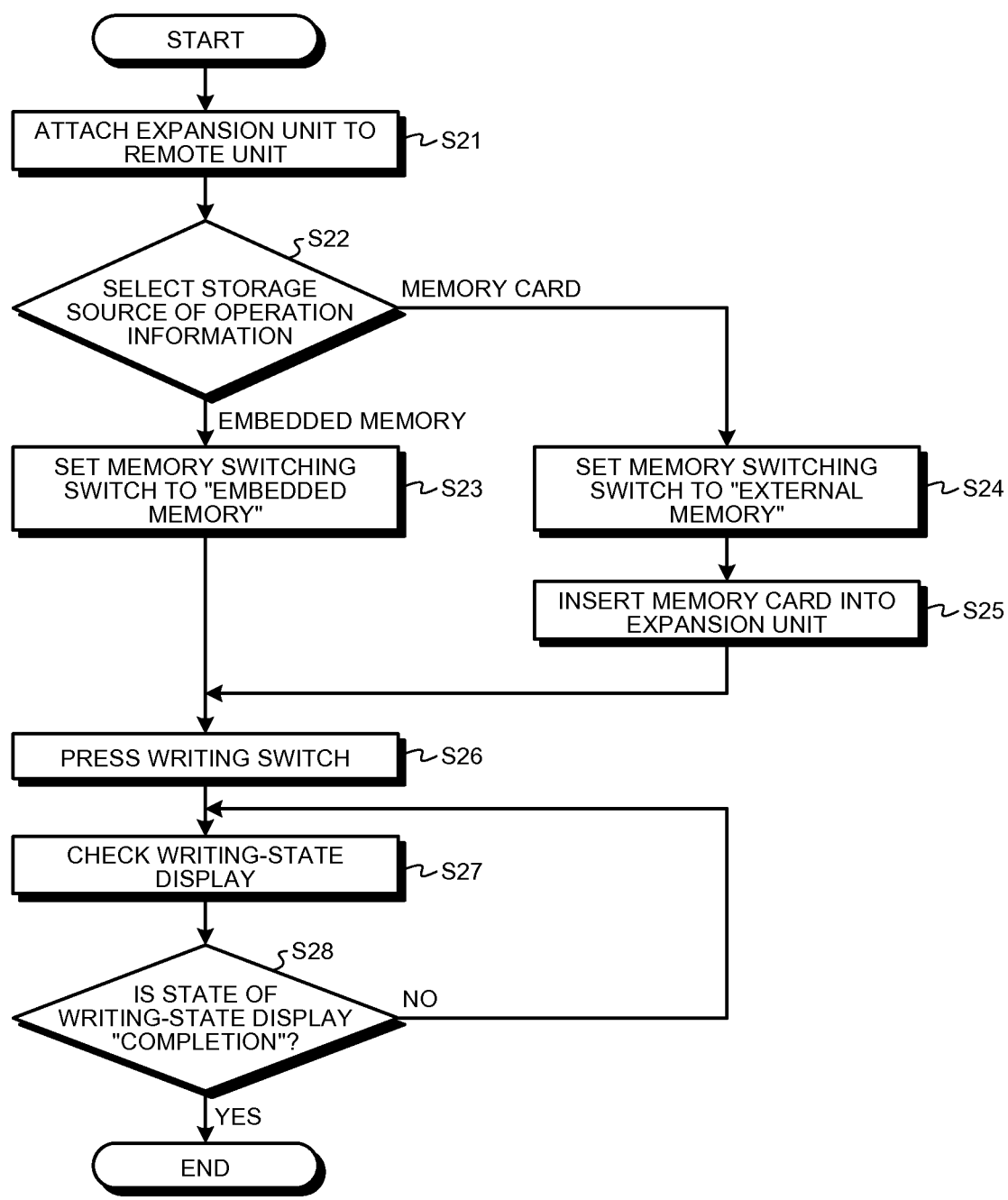

EXPANSION UNIT

CROSS REFERENCE TO RELATED APPLICATIONS

This application is a National Stage of International Application No. PCT/JP2012/069328 filed Jul. 30, 2012, the contents of all of which are incorporated herein by reference in their entirety.

FIELD

The present invention relates to an expansion unit that is connected to a distributed-system control device (a remote unit) of an industrial distributed control system.

BACKGROUND

In a distributed control system, a plurality of remote units that control control-target devices are used with the number of the remote units being set according to the number of control-target devices, and each of the remote units has recorded therein operation information for determining operations unique to the corresponding remote unit. Accordingly, when a unit is replaced at a time when, for example, the remote unit is broken down, it is necessary to read the operation information from the remote unit or to read the operation information in advance and write, in a new unit, the operation information in the remote unit that has been replaced after the unit is replaced.

Examples of the operation information include setting information for operating remote units or adjustment information (such as an offset/gain value in an analog unit) for eliminating individual differences between units.

With regard to the above problem, there is proposed a method of writing operation information in remote units via a network (see, for example, Patent Literature 1).

CITATION LIST

Patent Literature

Patent Literature 1: Japanese Patent Application Laid-open No. 2009-15401

SUMMARY

Technical Problem

However, in the invention disclosed in Patent Literature 1 mentioned above, information restored in remote units is held in a PLC that is connected through the network, and writing is performed on the basis of the signal transmitted from the PLC (Programmable Logic Controller); therefore, there is a problem in that a load is put on the PLC.

Furthermore, in a distributed control system, peripheral devices, such as a PLC or a PC (Personal Computer) that control the entire system, are often installed distant from remote units; therefore, when a unit is replaced due to a failure or the like, a user is required to install a new remote unit first and then move to the location of the PLC that controls the entire system to transmit a writing signal.

Further, most of the methods for reading and writing operation information in a remote unit are communication performed via a field network or communication performed by providing a communication I/F (Interface) unit to the remote unit to communicate with peripheral devices. When operation information is read via a field network, if the communication I/F unit of the remote unit is broken down, the operation information cannot be read from the remote unit. Furthermore, although space reduction and low cost are often required for remote units, if a peripheral communication I/F is mounted on the remote units, the size of these units is increased and the manufacturing cost thereof is also increased.

The present invention has been achieved in view of the above problems, and an object of the present invention is to provide an expansion unit that can easily read and write operation information in a remote unit.

Solution to Problem

In order to solve the above problems and achieve the object, the present invention relates to an expansion unit that is connected to a remote unit that controls a control-target device in a distributed control system on a basis of operation information set in advance, includes a connector to which the remote unit is connected; an embedded memory that records therein information in a nonvolatile manner; an external memory I/F into which a memory card is inserted; a CPU that performs reading of the operation information set in the remote unit that is connected via the connector and performs writing of the operation information into the remote unit that is connected via the connector; and a memory-switching-signal input unit that sets a writing destination of the operation information read from the remote unit that is connected to the connector and a reading source of the operation information to be written into the remote unit that is connected to the connector to any one of the memory card inserted into the external memory I/F and the embedded memory.

Advantageous Effects of the Invention

According to the expansion unit of the present invention, an effect is obtained where operation information in a remote unit can be easily read or written without requiring any other devices such as a peripheral device.

BRIEF DESCRIPTION OF DRAWINGS

FIG. 3 is a flowchart showing a procedure of reading operation information from a remote unit.

FIG. 4 is a flowchart showing a procedure of writing operation information into a remote unit.

DESCRIPTION OF EMBODIMENTS

Exemplary embodiments of an expansion unit according to the present invention will be explained below in detail with reference to the drawings. The present invention is not limited to the embodiments.

Embodiment

Figure 1:
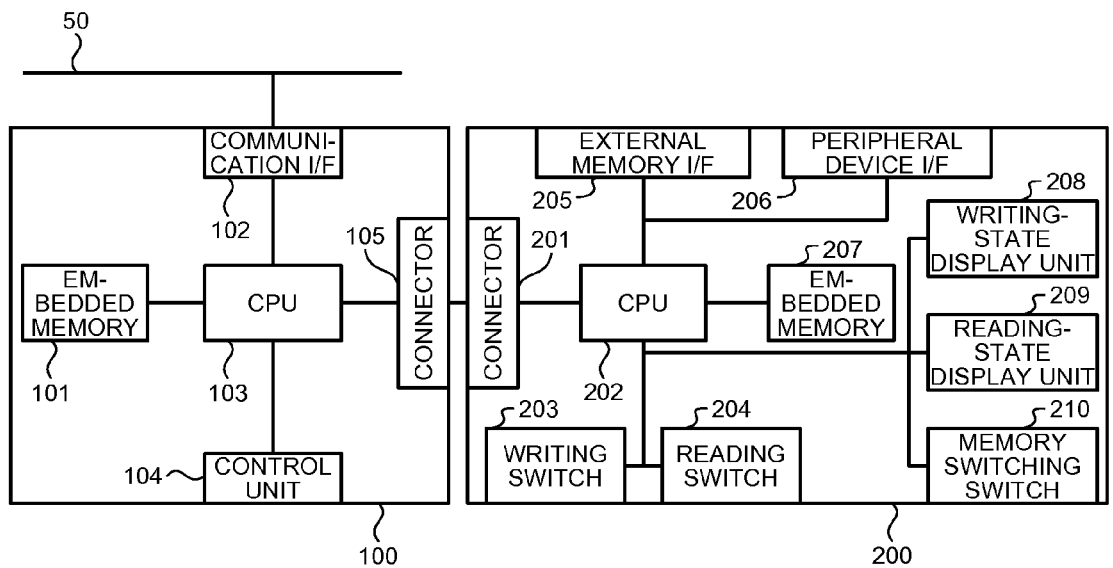
FIG. 1 is a diagram showing a configuration of an expansion unit according to an embodiment of the present invention.

FIG. 1 is a diagram showing a configuration of an expansion unit according to an embodiment of the present invention. An expansion unit 200 includes a connector 201 for connecting the expansion unit 200 to a remote unit 100, a peripheral device I/F 206 for connecting the expansion unit 200 to peripheral devices, such as a computer, an external memory I/F 205 for communication with a memory card, a writing switch 203 as a write-command-signal input unit that notifies a CPU 202 of a start of writing of operation information into the remote unit 100, a reading switch 204 as a read-start-command-signal input unit that notifies the CPU 202 of a start of reading of operation information from the remote unit 100, a writing-state display unit 208 that displays a state of a writing process, a reading-state display unit 209 that displays a state of a reading process, an embedded memory 207 that stores therein in a nonvolatile manner operation information in the remote unit 100 to be read and written, a memory switching switch 210 as a memory-switching-signal input unit that specifies a storage location of operation information, and the CPU (Central Processing Unit) 202 that performs overall control of these elements.

An LED (Light Emitting Diode) is applicable to the writing-state display unit 208, and the writing-state display unit 208 can display the writing state such as "writing in progress", "writing complete", and "operation abnormality", according to its lighting-on state such as lighting-on, flashing, and lighting-out. As for the reading-state display unit 209, an LED is also applicable thereto.

The connector 201 is a general-purpose connector that is connectable to various types of remote units such as a digital I/O (Input-Output) unit and an analog conversion unit.

The remote unit 100 is connected to the expansion unit 200. The remote unit 100 includes a communication I/F 102 that communicates with a PLC or other remote units via a field network 50, a connector 105 for connecting the remote unit 100 to the expansion unit 200, a control unit 104 that controls a control-target device, an embedded memory 101 that stores therein operation information for executing control of the control-target device, and a CPU 103 that performs overall control of these elements.

Figure 2:
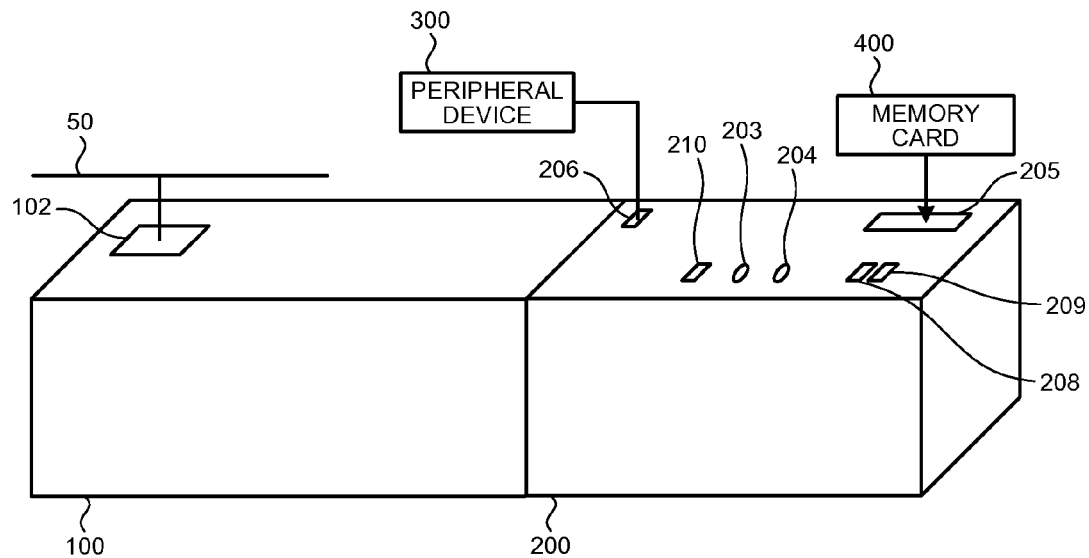
FIG. 2 is a perspective view of an expansion unit having a remote unit connected thereto.

FIG. 2 is a perspective view of the expansion unit having the remote unit connected thereto. The remote unit 100 and the expansion unit 200 are connected to each other by using the connector 105 and the connector 201. The expansion unit 200 having the remote unit 100 connected thereto is connected to the field network 50 via the communication I/F 102 of the remote unit 100. The expansion unit 200 is also connected to a peripheral device 300 via the peripheral device I/F 206 of the expansion unit 200. In the expansion unit 200, a memory card 400 can be inserted into the external memory I/F 205. The memory card 400 inserted into the external memory I/F 205 can be used as a storage device for storing therein operation information in the remote unit 100.

The content of the operation information read to the memory card 400 or the embedded memory 207 can be checked with the peripheral device 300 and the like. Similarly, by writing operation information set in advance by the peripheral device 300 and the like into the memory card 400 or the embedded memory 207, the set operation information can be reflected on the remote unit 100.

The expansion unit 200 can be attached to and detached from the remote unit 100 by using the connectors 201 and 105 even when the remote unit 100 is in operation.

Reading of operation information from the remote unit 100 and writing of operation information into the remote unit 100 are explained below.

FIG. 3 is a flowchart showing a procedure of reading operation information from the remote unit.

First, the expansion unit 200 is connected by a user to the remote unit 100 from which operation information is read (Step S11). At this point, the connector 105 and the connector 201 are coupled to each other.

Next, when a storage destination of the operation information is selected by the user (Step S12), if the operation information is stored in the embedded memory 207 (Step S12/embedded memory), the memory switching switch 210 is set by the user to "embedded memory", and this setting information is notified to the CPU 202 (Step S13). If the operation information is stored in an external memory (the memory card 400) (Step S12/memory card), the memory switching switch 210 is set by the user to "external memory", and this setting information is notified to the CPU 202 (Step S14). Subsequently, the memory card 400 is inserted into the external memory I/F 205 by the user (Step S15).

Thereafter, when the reading switch 204 is pressed by the user, the CPU 202 starts a reading process (Step S16). The CPU 202 reads operation information stored in the embedded memory 101 of the remote unit 100, and writes the read operation information in the notified storage destination selected at Step S12. Further, when the operation information is read, the CPU 202 also reads at the same time information that can specify what type of the remote unit 100 the operation information has been read from, where the information is the unit name or the function version of the remote unit 100 (hereinafter, this information is referred to as "device specification information"), and the CPU 202 stores the device specification information in the memory in which the operation information is stored along with the operation information.

When the reading process is performed, the CPU 202 displays the operation state such as "reading in progress", "normal completion", and "operation abnormality" on the reading-state display unit 209. The user checks the operation state with the reading-state display unit 209 after pressing the reading switch 204 (Step S17). With this process, it is possible to prevent mistakes such as that the user canceling the connection between the expansion unit 200 and the remote unit 100 and detaching the memory card 400 from the external memory I/F 205 before reading of the operation information is completed.

When the user recognizes that the reading state is not "normal completion" (NO at Step S18), the user continues checking the reading state (Step S17), and when the user recognizes that the reading state is "normal completion" (YES at Step S18), the reading of the operation information is completed.

The sequence of the reading process described above for reading operation information from the remote unit 100 is started after the CPU 202 has received a setting notification of "embedded memory" or a setting notification of "external memory"; however, the sequence of the reading process may be started after the CPU 202 has received a notification indicating that the connector 105 and the connector 201 are coupled to each other.

FIG. 4 is a flowchart showing a procedure of writing operation information into the remote unit.

First, the expansion unit 200 is connected by a user to the remote unit 100 into which operation information is written (Step S21). At this point, the connector 105 and the connector 201 are coupled to each other.

Next, when a storage source (reading source) of the operation information is selected by the user (Step S22), if the operation information is read from the embedded memory 207 (Step S22/embedded memory), the memory switching switch 210 is set by the user to "embedded memory", and this setting information is notified to the CPU 202 (Step S23). If the operation information is read from an external memory (the memory card 400) (Step S22/memory card), the memory switching switch 210 is set by the user to "external memory", and this setting information is notified to the CPU 202 (Step S24). Subsequently, the memory card 400 is inserted into the external memory I/F 205 by the user (Step S25).

Thereafter, when the writing switch 203 is pressed by the user, the CPU 202 starts a writing process (Step S26). The CPU 202 reads operation information from the notified storage source selected at Step S22. Subsequently, the CPU 202 communicates with the CPU 103 via the connectors 201 and 105, whereby the CPU 202 sends the read operation information to the CPU 103, and the CPU 103 records the received operation information in the embedded memory 101.

It is also possible to configure such that, when the operation information is written into the remote unit 100, the CPU 202 receives information such as the name or the function version of the remote unit 100 from the CPU 103 before sending the operation information read from the embedded memory 207 or the memory card 400 to the CPU 103, and checks whether the operation information read from the embedded memory 207 or the memory card 400 is compatible with the remote unit 100, on the basis of the comparison result between the operation information with device specification information read along with the operation information from the embedded memory 207 or the memory card 400.

When the writing process is performed, the CPU 202 displays the operation state such as "writing in progress", "normal completion", and "operation abnormality" on the writing-state display unit 208. The user checks the operation state with the writing-state display unit 208 after pressing the writing switch 203 (Step S27). With this process, it is possible to prevent mistakes such as that the user canceling the connection between the expansion unit 200 and the remote unit 100 and detaching the memory card 400 from the external memory I/F 205 before writing of the operation information is completed.

When the user recognizes that the writing state is not "normal completion" (NO at Step S28), the user continues checking the writing state (Step S27), and when the user recognizes that the writing state is "normal completion" (YES at Step S28), the writing of the operation information is completed.

The sequence of the writing process described above for writing operation information into the remote unit 100 is started after the CPU 202 has received a setting notification of "embedded memory" or a setting notification of "external memory"; however, the sequence of the writing process may be started after the CPU 202 has received a notification indicating that the connector 105 and the connector 201 are coupled to each other.

As described above, the expansion unit according to the present embodiment can transfer operation information in the remote unit even if any peripheral device is not connected to a distributed control system. Therefore, the man-hour can be reduced and the operations can be made easier. Further, even if a communication I/F unit of the remote unit is broken down, transfer of the operation information can be made. Further, it is not necessarily required to provide a peripheral communication I/F or a memory I/F in all the remote units of the distributed control system, and thus it is possible to establish a system with a reduced space and a simple configuration.

Because the connector 201 for connecting the remote unit 100 to the expansion unit 200 is a general-purpose connector, various types of remote units can be connected to the expansion unit 200. Further, because the expansion unit 200 can be attached to and detached from the remote unit 100 by using the connectors 201 and 105 even when the remote unit 100 is in operation, it is possible to perform reading and writing of operation information at an arbitrary timing (a timing at which transfer of operation information becomes necessary).

In the procedure of the present embodiment described above, as for the command to start reading and writing and display of reading and writing states, these are not limited to the above as far as they can be operated or checked by a user from the outside. For example, it is also possible to configure such that a display and an operation switch (an input device) are provided in the expansion unit 200 instead of a switch and an LED, and the operation and checking are performed by using these elements.

In the present embodiment, other than operation information, data read from the remote unit 100 may be information such as an error history held in the embedded memory 101 of the remote unit 100. With this configuration, even when the communication I/F 102 is broken down, as far as information that can specify the breakdown is recorded in the error history, the content of the information can be checked by using the expansion unit 200.

Furthermore, in the present embodiment, while operation information in the remote unit is stored in the expansion unit, the present embodiment is not limited to a configuration in which operation information in a single remote unit 100 is stored in the expansion unit 200, and operation information in a plurality of the remote units 100 and the like may be stored in a single expansion unit 200. In the present embodiment, when a remote unit is connected to the expansion unit 200 so as to write operation information into the remote unit, the expansion unit 200 first reads device specification information in the remote unit connected to the expansion unit 200 itself. The expansion unit 200 then compares the read device specification information and device specification information stored in advance in the embedded memory 207 or the memory card 400 of the expansion unit 200 itself, and searches for device specification information including the content that matches that of the read device specification information. When device specification information including the content that matches that of the read device specification information is found, the expansion unit 200 performs a writing process of operation information stored in the embedded memory 207 or the memory card 400 along with the device specification information into the remote unit. With this process, it becomes possible to achieve effects as described above with a single expansion unit without causing the user to pay attention to the type of the remote unit.

INDUSTRIAL APPLICABILITY

As described above, the expansion unit according to the present invention is suitable to be applied to a remote unit and a distributed control system.

REFERENCE SIGNS LIST 50 field network, 100 remote unit, 101, 207 embedded memory, 102 communication I/F, 103, 202 CPU, 104 control unit, 105, 201 connector, 200 expansion unit, 203 writing switch, 204 reading switch, 205 external memory I/F, 206 peripheral device I/F, 208 writing-state display unit, 209 reading-state display unit, 210 memory switching switch.

The invention claimed is:

1. An expansion unit that is connected to a remote unit that controls a control-target device in a distributed control system on a basis of operation information set in advance, the expansion unit comprising:
   a connector that connects the expansion unit directly to the remote unit while the remote unit is not connected to a field network and the remote unit is in operation;
   an embedded memory that records therein information and maintains the recorded information regardless if power to the expansion unit is on or off;
   an external memory interface into which a memory card is insertable;
   a central processing unit that performs reading of the operation information set in the remote unit that is connected via the connector and performs writing of the operation information into the remote unit that is connected via the connector; and
   a memory-switching-signal inputter to set a writing destination of the operation information read from the remote unit that is connected to the connector and a reading source of the operation information to be written into the remote unit that is connected to the connector to the memory card inserted into the external memory interface or the embedded memory,
   wherein the central processing unit reads an error history file stored in the remote unit through the connector while the remote unit is not connected to the field network,
   wherein the connector is a general-purpose connector that is connectable to different types of remote units including the remote unit,
   wherein the central processing unit receives, through the general-purpose connector, a device specification that is stored in the remote unit connected to the expansion unit, compares the received device specification with a plurality of device specifications stored in the expansion unit, and searches for a device specification, among the plurality of device specifications stored in the expansion unit, which matches the received device specification, and
   wherein the central processing unit initiates the writing when the central processing unit determines that the received device specification matches at least one of the plurality of device specifications stored in the expansion unit.

2. The expansion unit according to claim 1, further comprising a peripheral device interface that controls entirety of the distributed control system and to which a peripheral device including a display device is connected, wherein
   the operation information recorded in the embedded memory or in the memory card inserted into the external memory interface is displayed on the display device of the peripheral device that is connected to the peripheral device interface.

3. The expansion unit according to claim 1, wherein
   device specification information that specifies a remote unit that is a reading source of the operation information is recorded along with the operation information in the embedded memory or in the memory card inserted into the external memory interface, and
   when the remote unit connected to the connector is different from a remote unit that is a reading source of the operation information, the central processing unit stops writing of the operation information.

4. The expansion unit according to claim 1, further comprising:
   a reading-state display unit that displays a reading state of the operation information from the remote unit; and
   a writing-state display unit that displays a writing state of the operation information into the remote unit.

5. The expansion unit according to claim 1, wherein the memory-switching-signal inputter determines whether the writing destination and the reading source are set to the memory card or the embedded memory in response to a user command being input through a memory switching switch.

6. The expansion unit according to claim 1, further comprises a light emitting diode indicating a writing state of the operation information,
   wherein the writing state includes a first state indicating that the writing operation is in progress, a second state indicating that the writing operation has been completed, and a third state indicating that the writing operation is abnormal.

* * * * *